United States Patent
Muley et al.

(10) Patent No.: US 11,382,022 B2
(45) Date of Patent: Jul. 5, 2022

(54) METHOD, APPARATUS, AND COMPUTER PROGRAM PRODUCT FOR PACKET FORWARDING CONTROL PROTOCOL MESSAGES BUNDLING

(71) Applicant: Nokia Technologies Oy, Espoo (FI)

(72) Inventors: Praveen Muley, Los Altos Hills, CA (US); Bruno Landais, Pleumeur Bodou (FR)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 16/991,629

(22) Filed: Aug. 12, 2020

(65) Prior Publication Data

US 2021/0051564 A1    Feb. 18, 2021

Related U.S. Application Data

(60) Provisional application No. 62/888,166, filed on Aug. 16, 2019.

(51) Int. Cl.
*H04W 40/12* (2009.01)
*H04L 67/1042* (2022.01)
(Continued)

(52) U.S. Cl.
CPC ....... *H04W 40/125* (2013.01); *H04L 67/1044* (2013.01); *H04L 67/142* (2013.01); *H04W 84/02* (2013.01)

(58) Field of Classification Search
None
See application file for complete search history.

(56) References Cited

U.S. PATENT DOCUMENTS 10,574,670 B1 * 2/2020 Verma .................. H04W 12/06
2010/0008299 A1 * 1/2010 Shin ...................... H04W 88/16
370/328

(Continued)

OTHER PUBLICATIONS

"PFCP Messages Bundling", 3GPP TSG-CT WG4 Meeting #93, 04-193312, Nokia, Aug. 26-30, 2019, 9 pages.

(Continued)

*Primary Examiner* — Kenny S Lin
(74) *Attorney, Agent, or Firm* — Harness, Dickey & Pierce, P.L.C.

(57) ABSTRACT

Methods and apparatus, including computer program products, are provided for packet forwarding control protocol (PFCP) message bundling. In an example embodiment, an apparatus comprises at least one processor and at least one memory including computer program code. In some embodiments, apparatus can be configured to: determine that more than one control protocol messages should be sent between a control plane entity and a user plane entity or said user plane entity and said control plane entity; determine the control plane entity and the user plane entity support sending and receiving a single datagram carrying more than one control protocol messages; extend a header of each control protocol message to indicate that the datagram is carrying more than one control protocol messages; combine one or more message types and respective message elements of the more than one control protocol messages into the single datagram; and cause sending said single datagram.

18 Claims, 8 Drawing Sheets

(51) Int. Cl.
    *H04L 67/104*     (2022.01)
    *H04L 67/142*     (2022.01)
    *H04W 84/02*     (2009.01)

(56) References Cited

U.S. PATENT DOCUMENTS

| | | | |
|---|---|---|---|
| 2015/0103691 A1* | 4/2015 | Bhattacharya | H04L 41/0803 370/254 |
| 2019/0141169 A1* | 5/2019 | Ni | H04L 69/329 |
| 2019/0208563 A1* | 7/2019 | Zee | H04W 76/38 |
| 2020/0053828 A1* | 2/2020 | Bharatia | H04W 68/005 |
| 2020/0059992 A1* | 2/2020 | Skog | H04L 67/14 |
| 2020/0245296 A1* | 7/2020 | Kimura | H04W 72/04 |
| 2021/0176808 A1* | 6/2021 | Zhu | H04W 76/15 |
| 2021/0289566 A1* | 9/2021 | Jimenez Cordon | H04L 63/1458 |
| 2021/0297535 A1* | 9/2021 | Puente Pestana | H04M 15/852 |

OTHER PUBLICATIONS

International Search Report and Written Opinion received for corresponding Patent Cooperation Treaty Application No. PCT/EP2020/072178, dated Sep. 18, 2020, 10 pages.

Stewart, "Stream Control Transmission Protocol", RFC 4960, Network Working Group, Sep. 2007, pp. 1-152.

* cited by examiner

FIG. 5

| Octets | Bits | | | | | | | |
|---|---|---|---|---|---|---|---|---|
| | 8 | 7 | 6 | 5 | 4 | 3 | 2 | 1 |
| 1 | Version | | | Spare | Spare | FO | MP | S |
| 2 | Message Type | | | | | | | |
| 3 | Message Length (1st Octet) | | | | | | | |
| 4 | Message Length (2nd Octet) | | | | | | | |
| m to k(m+7) | If S flag is set to 1, then SEID shall be placed into octets 5-12. Otherwise, SEID field is not present at all. | | | | | | | |
| n to (n+2) | Sequence Number | | | | | | | |
| (n+3) | Spare | | | | | | | |

FIG. 6

| Octets | Bits | | | | | | | |
|---|---|---|---|---|---|---|---|---|
| | 8 | 7 | 6 | 5 | 4 | 3 | 2 | 1 |
| 1 | Version | | | Spare | Spare | FO=0 | MP=0 | S=0 |
| 2 | Message Type | | | | | | | |
| 3 | Message Length (1st Octet) | | | | | | | |
| 4 | Message Length (2nd Octet) | | | | | | | |
| 5 | Sequence Number (1st Octet) | | | | | | | |
| 6 | Sequence Number (2nd Octet) | | | | | | | |
| 7 | Sequence Number (3rd Octet) | | | | | | | |
| 8 | Spare | | | | | | | |

| Octets | Bits | | | | | | | |
|---|---|---|---|---|---|---|---|---|
| | 8 | 7 | 6 | 5 | 4 | 3 | 2 | 1 |
| 1 | Version | | | Spare | Spare | FO | MP | S=1 |
| 2 | Message Type |||||||||
| 3 | Message Length (1st Octet) |||||||||
| 4 | Message Length (2nd Octet) |||||||||
| 5 | Session Endpoint Identifier (1st Octet) |||||||||
| 6 | Session Endpoint Identifier (2nd Octet) |||||||||
| 7 | Session Endpoint Identifier (3rd Octet) |||||||||
| 8 | Session Endpoint Identifier (4th Octet) |||||||||
| 9 | Session Endpoint Identifier (5th Octet) |||||||||
| 10 | Session Endpoint Identifier (6th Octet) |||||||||
| 11 | Session Endpoint Identifier (7th Octet) |||||||||
| 12 | Session Endpoint Identifier (8th Octet) |||||||||
| 13 | Sequence Number (1st Octet) |||||||||
| 14 | Sequence Number (2nd Octet) |||||||||
| 15 | Sequence Number (3rd Octet) |||||||||
| 16 | Message Priority | | | | Spare | | | |

FIG. 7

|  | Bits | | | | | | | |
|---|---|---|---|---|---|---|---|---|
| Octets | 8 | 7 | 6 | 5 | 4 | 3 | 2 | 1 |
| 1 to 2 | Type = 43 (decimal) | | | | | | | |
| 3 to 4 | Length = n | | | | | | | |
| 5 to 6 | Supported-Features | | | | | | | |
| 7 to 8 | Additional Supported-Features 1 | | | | | | | |
| 9 to (n+4) | These octet(s) is/are present only if explicitly specified | | | | | | | |

FIG. 8

| 7/x | BUNDL | Sxa, Sxb, Sxc, N4 | PFCP messages bunding (see clause 6.x) is supported by the UP function. |
|---|---|---|---|

| Octets | Bits | | | | | | | |
|---|---|---|---|---|---|---|---|---|
| | 8 | 7 | 6 | 5 | 4 | 3 | 2 | 1 |
| 1 to 2 | Type = 89 (decimal) | | | | | | | |
| 3 to 4 | Length = n | | | | | | | |
| 5 | Supported-Features | | | | | | | |
| 6 to (n+4) | These octet(s) is/are present only if explicitly specified | | | | | | | |

FIG. 11

| 5/x | BUNDL | Sxa, Sxb, Sxc, N4 | PFCP messages bundling (see clause 6.x) is supported by the CP function. |
|---|---|---|---|

METHOD, APPARATUS, AND COMPUTER PROGRAM PRODUCT FOR PACKET FORWARDING CONTROL PROTOCOL MESSAGES BUNDLING

CROSS-REFERENCE TO RELATED APPLICATIONS

The present application claims priority to, and the benefit of, U.S. Provisional Patent Application No. 62/888,166, filed Aug. 16, 2019, entitled "Method, Apparatus, and Computer Program Product for Packet Forwarding Control Protocol Messages Bundling," the entire disclosure of which is hereby incorporated herein by reference in its entirety for all purposes.

FIELD

The subject matter described herein relates to wireless telecommunications.

BACKGROUND

Users of modern telecommunications networks have adopted the use of such networks to access, move, and process significant volumes of data. As a result, telecommunications networks have become an essential and irreplaceable tool supporting many aspects of the way people conduct business, access important information, and go about their daily lives. While many modern telecommunications networks have proven capable of providing reliable service to many users, the centrality of network connectivity to processes that touch on essential aspects of users' health, safety, business, and lifestyle has created the need for improvements in the reliability and resiliency of current and next-generation telecommunications networks.

Telecommunication networks, such as the fifth generation of mobile networks (5G networks) are expected to be the next major phase of mobile telecommunication standards and to bring many improvements in mobile network user experience. For instance, 5G networks should provide new technical solutions allowing a greater throughput, lower latency, higher reliability, higher connectivity and higher mobility range.

In addition to these improvements in terms of performance, 5G networks are also expected to extend the flexibility in the network usage and to allow providing users with a wider range of use cases and business models.

SUMMARY

Methods, apparatuses, and computer program products are provided for packet forwarding control protocol (PFCP) message bundling.

In some example embodiments, there may be provided an apparatus including at least one processor and at least one memory including computer program code, the at least one memory and the computer program code configured to, with the at least one processor, cause the apparatus to at least: determine that more than one control protocol messages should be sent from either a control plane entity to a user plane entity or from said user plane entity to said control plane entity; determine whether the control plane entity and the user plane entity both support sending and receiving a single datagram carrying said more than one control protocol messages; extend a header of each of said more than one control protocol messages to indicate that the single datagram is carrying said more than one control protocol messages; combine one or more message types and respective message elements of the more than one control protocol messages into said single datagram; and either cause said control plane entity to send said single datagram carrying said more than one control protocol messages to said user plane entity, or cause said user plane entity to send said single datagram carrying said more than one control protocol messages to said control plane entity. In some embodiments, said user plane entity comprises a user plane function and said control plane entity comprises a session management function. In some embodiments, said session management function can comprise a 5GC session management function for any suitable control and user plane separation (CUPS) architecture, such as for the gateway GPRS support node (GGSN-C), trusted wireless access gateway (TWAG-C), broadband network gateways (BNGs), N4, Sxa, Sxb, Sxc, evolved packet core (EPC) SWG-C, EPC PGW-C, EPC TDF-C, and/or the like. In some embodiments, said control protocol message comprises a packet forwarding control protocol (PFCP) message. In some embodiments, the at least one memory and the computer program code configured to, with the at least one processor, cause the apparatus to at least: extend the header of each of said more than one control protocol messages to include a follow on flag to indicate that the single datagram is carrying said more than one control protocol messages. In some embodiments, said single control protocol message comprises a single UDP/IP packet configured to be packetized, exchanged, and processed over an N4 interface in a fifth generation core (5GC) network or over an Sxa, Sxb, or Sxc interface in an Evolved Packet Core (EPC) network. In some embodiments, said more than one control protocol messages carried in a single control protocol message are control plane requests or responses related to a same PFCP session or to different PFCP sessions handled by a same peer PFCP entity.

According to another embodiment, a method is provided, said method comprising determining that more than one control protocol messages should be sent from either a control plane entity to a user plane entity or from said user plane entity to said control plane entity; determining whether the control plane entity and the user plane entity both support sending and receiving a single datagram carrying said more than one control protocol messages; extending a header of each of said more than one control protocol messages to indicate that the single datagram is carrying said more than one control protocol messages; combining one or more message types and respective message elements of the more than one control protocol messages into said single datagram; and either causing said control plane entity to send said single datagram carrying said more than one control protocol messages to said user plane entity, or causing said user plane entity to send said single datagram carrying said more than one control protocol messages to said control plane entity. In some embodiments, said user plane entity comprises a user plane function and said control plane entity comprises a session management function. In some embodiments, said session management function can comprise a 5GC session management function any suitable control and user plane separation (CUPS) architecture, such as for the gateway GPRS support node (GGSN-C), trusted wireless access gateway (TWAG-C), broadband network gateways (BNGs), N4, Sxa, Sxb, Sxc, evolved packet core (EPC) SWG-C, EPC PGW-C, EPC TDF-C, and/or the like. In some embodiments, said control protocol message comprises a packet forwarding control protocol (PFCP) message. In some embodiments, the method can further comprise extending the header of each of said more than one control protocol messages to include a follow on flag to indicate that the single datagram is carrying said more than one control protocol messages. In some embodiments, said single control protocol message comprises a single user datagram/internet protocol (UDP/IP) packet configured to be packetized, exchanged, and processed over an N4 interface in a fifth generation core (5GC) network or over an Sxa Sxb or Sxc interface in an Evolved Packet Core (EPC) network. In some embodiments, said more than one control protocol messages carried in a single control protocol message are control plane requests or responses related to a same PFCP session or to different PFCP sessions handled by a same peer PFCP entity.

According to yet another embodiment, an apparatus is provided, said apparatus comprising means, such as the apparatus described above comprising one or more processors and one or more memory including program code, for determining that more than one control protocol messages should be sent from either a control plane entity to a user plane entity or from said user plane entity to said control plane entity; means for determining whether the control plane entity and the user plane entity both support sending and receiving a single datagram carrying said more than one control protocol messages; means for extending a header of each of said more than one control protocol messages to indicate that the single datagram is carrying said more than one control protocol messages; means for combining one or more message types and respective message elements of the more than one control protocol messages into said single datagram; and either means for causing said control plane entity to send said single datagram carrying said more than one control protocol messages to said user plane entity, or means for causing said user plane entity to send said single datagram carrying said more than one control protocol messages to said control plane entity. In some embodiments, said user plane entity comprises a user plane function and said control plane entity comprises a session management function. In some embodiments, said session management function can comprise a 5GC session management function for any suitable control and user plane separation (CUPS) architecture, such as for the gateway GPRS support node (GGSN-C), trusted wireless access gateway (TWAG-C), broadband network gateways (BNGs), N4, Sxa, Sxb, Sxc, evolved packet core (EPC) SWG-C, EPC PGW-C, EPC TDF-C, and/or the like. In some embodiments, said control protocol message comprises a packet forwarding control protocol (PFCP) message. In some embodiments, said apparatus can further comprise means for extending the header of each of said more than one control protocol messages to include a follow on flag to indicate that the single datagram is carrying said more than one control protocol messages. In some embodiments, said single control protocol message comprises a single UDP/IP packet configured to be packetized, exchanged, and processed over an N4 interface in a fifth generation core (5GC) network or over an Sxa Sxb or Sxc interface in an Evolved Packet Core (EPC) network. In some embodiments, said more than one control protocol messages carried in a single control protocol message are control plane requests or responses related to a same PFCP session or to different PFCP sessions handled by a same peer PFCP entity.

According to still another embodiment, a computer readable medium is provided, such as a non-transitory computer readable including program code which, when executed, causes operations comprising: determining that more than one control protocol messages should be sent from either a control plane entity to a user plane entity or from said user plane entity to said control plane entity; determining whether the control plane entity and the user plane entity both support sending and receiving a single datagram carrying said more than one control protocol messages; extending a header of each of said more than one control protocol messages to indicate that the single datagram is carrying said more than one control protocol messages; combining one or more message types and respective message elements of the more than one control protocol messages into said single datagram; and either causing said control plane entity to send said single datagram carrying said more than one control protocol messages to said user plane entity, or causing said user plane entity to send said single datagram carrying said more than one control protocol messages to said control plane entity. In some embodiments, said user plane entity comprises a user plane function and said control plane entity comprises a session management function. In some embodiments, said session management function can comprise a 5GC session management function for any suitable control and user plane separation (CUPS) architecture, such as for the gateway GPRS support node (GGSN-C), trusted wireless access gateway (TWAG-C), broadband network gateways (BNGs), N4, Sxa, Sxb, Sxc, evolved packet core (EPC) SWG-C, EPC PGW-C, EPC TDF-C, and/or the like. In some embodiments, said control protocol message comprises a packet forwarding control protocol (PFCP) message. In some embodiments, the program code, when executed, can further cause operations comprising: extending the header of each of said more than one control protocol messages to include a follow on flag to indicate that the single datagram is carrying said more than one control protocol messages. In some embodiments, said single control protocol message comprises a single UDP/IP packet configured to be packetized, exchanged, and processed over an N4 interface in a fifth generation core (5GC) network or over an Sxa Sxb or Sxc interface in an Evolved Packet Core (EPC) network. In some embodiments, said more than one control protocol messages carried in a single control protocol message are control plane requests or responses related to a same PFCP session or to different PFCP sessions handled by a same peer PFCP entity.

The above-noted aspects and features may be implemented in systems, apparatus, methods, and/or articles depending on the desired configuration. The details of one or more variations of the subject matter described herein are set forth in the accompanying drawings and the description below. Features and advantages of the subject matter described herein will be apparent from the description and drawings, and from the claims.

BRIEF DESCRIPTION OF THE DRAWINGS

In the drawings,

FIG. 5 depicts a message header, e.g., for a PFCP message, that includes a follow on flag indicating that a further message is bundled in the same datagram, in accordance with some example embodiments;

FIG. 6 depicts a message header, e.g., a PFCP message header for node related message, that includes a follow on flag indicating that a further message is bundled in the same datagram;

FIG. 7 depicts a message header, e.g., a PFCP message header for session related messages, that includes a follow on flag indicating that a further message is bundled in the same datagram;

FIG. 8 depicts a message indicating user plane function features, in accordance with some example embodiments;

FIG. 9 depicts a feature support flag indicating that a user plane function supports bundled messages, e.g., PFCP message bundling, in accordance with some example embodiments;

FIG. 10 depicts a message indicating control plane function features, in accordance with some example embodiments;

FIG. 11 depicts a feature support flag indicating that a control plane function supports bundled messages, e.g., PFCP message bundling, in accordance with some example embodiments.

Figure 1:
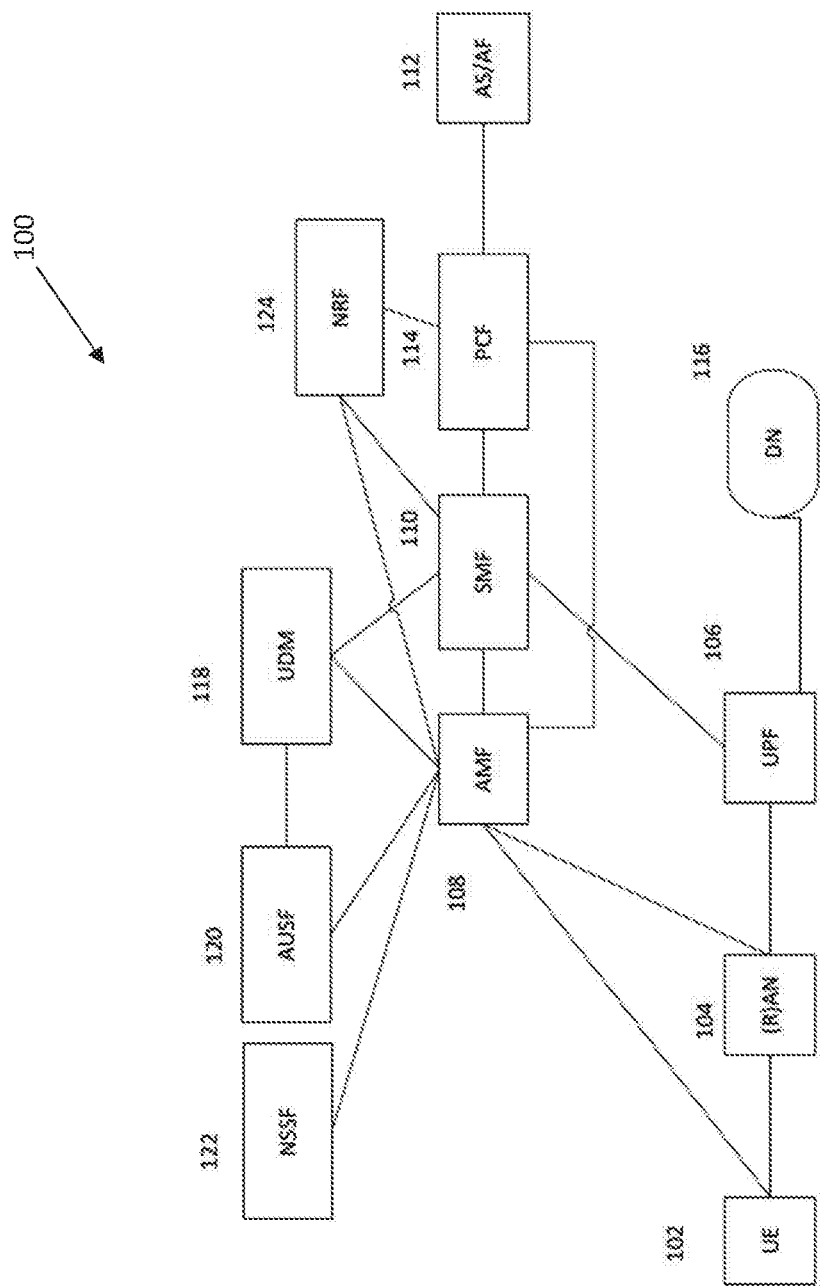
FIG. 1 depicts an example of a portion of a 5G wireless network, in accordance with some example embodiments.

Like labels are used to refer to same or similar items in the drawings.

DETAILED DESCRIPTION

Some embodiments will now be described more fully hereinafter with reference to the accompanying drawings, in which some, but not all, embodiments of the present disclosure are shown. Indeed, various embodiments of the present disclosure may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present disclosure. Thus, use of any such terms should not be taken to limit the spirit and scope of embodiments of the present disclosure.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, field programmable gate array, and/or other computing device.

As defined herein, a "computer-readable storage medium," which refers to a physical storage medium (e.g., volatile or non-volatile memory device), may be differentiated from a "computer-readable transmission medium," which refers to an electromagnetic signal.

Referring now to FIG. 1, It will be appreciated that example embodiments of the invention disclosed and/or otherwise described herein arise in the context of a telecommunications network, including but not limited to a telecommunications network that conforms to and/or otherwise incorporates aspects of a fifth-generation (5G) architecture. FIG. 1 is an example networked system 100 in accordance with an example embodiment of the present disclosure. FIG. 1 specifically illustrates User Equipment (UE) 102, which may be in communication with a Radio Access Network (RAN) 104 and Access and Mobility Management Function (AMF) 108 and User Plane Function (UPF) 106. The AMF 108 may, in turn, be in communication with core network services including Session Management Function (SMF) 110 and Policy Control Function (PCF) 114. The core network services may also be in communication with an Application Server/Application Function (AS/AF) 112. Other networked services also include Network Slice Selection Function (NSSF) 122, Authentication Server Function (AUSF) 120, User Data Management (UDM) 118, and Data Network (DN) 116. In some example implementations of embodiments of the present disclosure, an AMF, SMF, UPF, PCF, AUSF, UDM, AF, and NSSF are each considered to be an NF. It will be appreciated that one or more additional network functions (NF) and Network Resource Functions (NRFs) may be incorporated into the networked system. As shown in FIG. 1, NRF 124 is incorporated into the network and is configured to interface with other network functions, including but not necessarily limited to the AMF 108, the SMF 110, and the PCF 114. The methods, devices, and computer program products described herein are described within the context of a fifth generation (5G) core network and system such as described in FIG. 1, however the described approaches can be applied in a broader context within any suitable telecommunications system, network, standard, or protocol.

Figure 2:
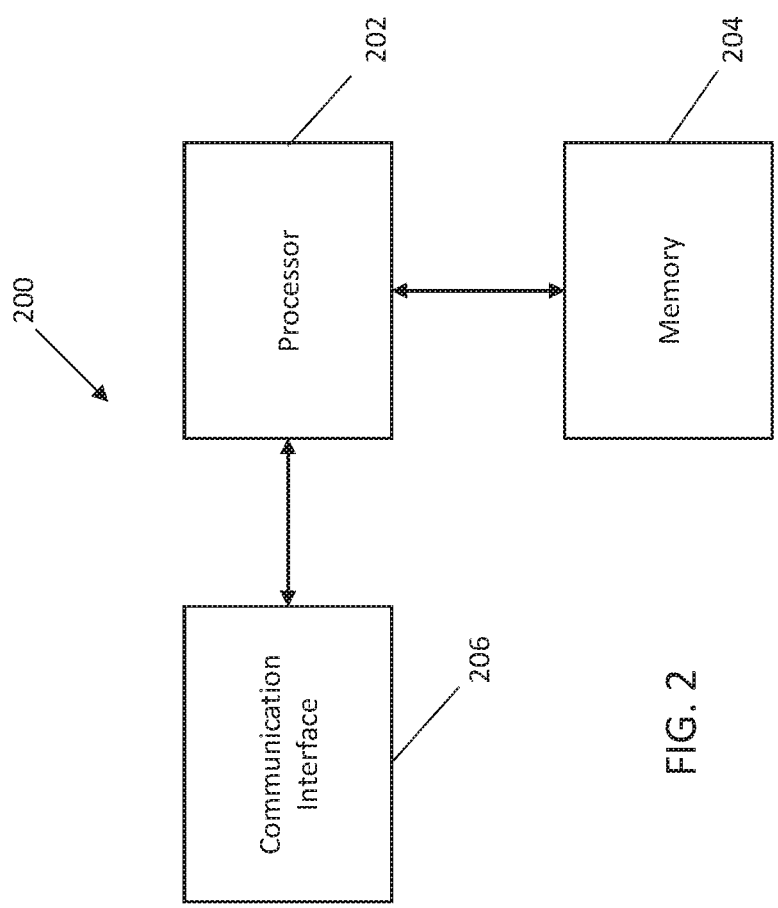
FIG. 2 depicts an example of an apparatus, in accordance with some example embodiments.

Turning now to FIG. 2, examples of a core network apparatus (CNA) (including the core network services: UPF 106, AMF 108, SMF 110, PCF 114, and/or another NF and/or NRF) may be embodied as a core network apparatus 200 as configured in accordance with an example embodiment of the present disclosure. As described below in conjunction with the flowcharts of FIGS. 3 and 4, the CNA 200 of an example embodiment may be configured to perform the functions described herein. In any instance, the CNA 200 may more generally be embodied by a computing device, such as a server, a personal computer, a computer workstation or other type of computing device including those functioning as a user equipment and/or a wireless local area network. Regardless of the manner in which the CNA 200 is embodied, the apparatus of an example embodiment may be configured as shown in FIG. 2 so as to include, be associated with or otherwise be in communication with processing circuitry 208 including, for example, a processor 202 and a memory device 204 and, in some embodiments, and/or a communication interface 206.

In the processing circuitry 208, the processor 202 (and/or co-processors or any other circuitry assisting or otherwise associated with the processor) may be in communication with the memory device 204 via a bus for passing information among components of the CNA 200. The memory device may include, for example, one or more volatile and/or non-volatile memories. In other words, for example, the memory device may be an electronic storage device (e.g., a computer readable storage medium) comprising gates configured to store data (e.g., bits) that may be retrievable by a machine (e.g., a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

The CNA 200 may, in some embodiments, be embodied in various computing devices as described above. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 202 may be embodied in a number of different ways. For example, the processor may be embodied as one or more of various hardware processing means such as a coprocessor, a microprocessor, a controller, a digital signal processor (DSP), a processing element with or without an accompanying DSP, or various other circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 202 may be configured to execute instructions stored in the memory device 204 or otherwise accessible to the processor. Alternatively or additionally, the processor may be configured to execute hard coded functionality. As such, whether configured by hardware or software methods, or by a combination thereof, the processor may represent an entity (e.g., physically embodied in circuitry) capable of performing operations according to an embodiment of the present disclosure while configured accordingly. Thus, for example, when the processor is embodied as an ASIC, FPGA or the like, the processor may be specifically configured hardware for conducting the operations described herein. Alternatively, as another example, when the processor is embodied as an executor of instructions, the instructions may specifically configure the processor to perform the algorithms and/or operations described herein when the instructions are executed. However, in some cases, the processor may be a processor of a specific device (e.g., an encoder and/or a decoder) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

In embodiments that include a communication interface 206, the communication interface may be any means such as a device or circuitry embodied in either hardware or a combination of hardware and software that is configured to receive and/or transmit data from/to a network and/or any other device or module in communication with the CNA 200, such as NF, NRF, UE, radio access network, core network services, an application server/function, a database or other storage device, etc. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware/software for supporting communication via cable, digital subscriber line (DSL), universal serial bus (USB) or other mechanisms. In some embodiments, a session management function can comprise a 5GC session management function for any suitable CUPS architecture, such as for the gateway GPRS support node (GGSN-C), TWAG-C, BNG-CUPS, N4, Sxa, Sxb, Sxc, evolved packet core (EPC) SWG-C, EPC PGW-C, EPC TDF-C, and/or the like.

In some embodiments, the core network apparatus 200 may represent a user equipment that is configured to be connected to other core network entities or network equipment. In some embodiments, user equipment can comprise a mobile telephone (cell phone) or the like.

As illustrated, the apparatus 200 can include a processor 202 in communication with a memory 204 and configured to provide signals to and receive signals from a communication interface 206. In some embodiments, the communication interface 206 can include a transmitter and a receiver. In some embodiments, the processor 202 can be configured to control the functioning of the apparatus 200, at least in part. In some embodiments, the processor 202 may be configured to control the functioning of the transmitter and receiver by effecting control signalling via electrical leads to the transmitter and receiver. Likewise, the processor 202 may be configured to control other elements of apparatus 200 by effecting control signalling via electrical leads connecting the processor 202 to the other elements, such as a display or the memory 204. The processor 202 may, for example, be embodied in a variety of ways including circuitry, at least one processing core, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits (for example, an application specific integrated circuit (ASIC), a field programmable gate array (FPGA), and/or the like), or some combination thereof. Accordingly, although illustrated in FIG. 2 as a single processor, in some example embodiments the processor 202 may comprise a plurality of processors or processing cores.

The apparatus 200 may be capable of operating with one or more air interface standards, communication protocols, modulation types, access types, and/or the like. Signals sent and received by the processor 202 may include signalling information in accordance with an air interface standard of an applicable cellular system, and/or any number of different wireline or wireless networking techniques, comprising but not limited to Wi-Fi, wireless local access network (WLAN) techniques, such as Institute of Electrical and Electronics Engineers (IEEE) 802.11, 802.16, 802.3, ADSL, DOCSIS, and/or the like. In addition, these signals may include speech data, user generated data, user requested data, and/or the like.

For example, the apparatus 200 and/or a cellular modem therein may be capable of operating in accordance with various first generation (1G) communication protocols, second generation (2G or 2.5G) communication protocols, third-generation (3G) communication protocols, fourth-generation (4G) communication protocols, fifth-generation (5G) communication protocols, Internet Protocol Multimedia Subsystem (IMS) communication protocols (for example, session initiation protocol (SIP) and/or the like. For example, the apparatus 10 may be capable of operating in accordance with 2G wireless communication protocols IS-136, Time Division Multiple Access TDMA, Global System for Mobile communications, GSM, IS-95, Code Division Multiple Access, CDMA, and/or the like. In addition, for example, the apparatus 10 may be capable of operating in accordance with 2.5G wireless communication protocols General Packet Radio Service (GPRS), Enhanced Data GSM Environment (EDGE), and/or the like. Further, for example, the apparatus 200 may be capable of operating in accordance with 3G wireless communication protocols, such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The apparatus 200 may be additionally capable of operating in accordance with 3.9G wireless communication protocols, such as Long Term Evolution (LTE), Evolved Universal Terrestrial Radio Access Network (E-UTRAN), and/or the like. Additionally, for example, the apparatus 200 may be capable of operating in accordance with 4G wireless communication protocols, such as LTE Advanced, 5G, and/or the like as well as similar wireless communication protocols that may be subsequently developed. In some embodiments, the apparatus 200 may be capable of operating according to or within the framework of any suitable control and user plane separation (CUPS) architecture, such as for the gateway GPRS support node (GGSN-C), trusted wireless access gateway (TWAG-C), broadband network gateways (BNGs), N4, Sxa, Sxb, Sxc, evolved packet core (EPC) SWG-C, EPC PGW-C, EPC TDF-C, and/or the like.

It is understood that the processor 202 may include circuitry for implementing audio/video and logic functions of the apparatus 200. For example, the processor 202 may comprise a digital signal processor device, a microprocessor device, an analog-to-digital converter, a digital-to-analog converter, and/or the like. Control and signal processing functions of the apparatus 200 may be allocated between these devices according to their respective capabilities. The processor 202 may additionally comprise an internal voice coder (VC), an internal data modem (DM), and/or the like. Further, the processor 202 may include functionality to operate one or more software programs, which may be stored in memory 204. In general, the processor 202 and software instructions stored in memory 206 may be configured to cause apparatus 200 to perform actions. For example, the processor 202 may be capable of operating a connectivity program, such as a web browser. The connectivity program may allow the apparatus 200 to transmit and receive web content, such as location-based content, according to a protocol, such as wireless application protocol, WAP, hypertext transfer protocol, HTTP, and/or the like.

Apparatus 200 may also comprise a user interface including, for example, an earphone or speaker, a ringer, a microphone, a display, a user input interface, and/or the like, which may be operationally coupled to the processor 202. The display may, as noted above, include a touch sensitive display, where a user may touch and/or gesture to make selections, enter values, and/or the like. The processor 202 may also include user interface circuitry configured to control at least some functions of one or more elements of the user interface, such as the speaker, the ringer, the microphone, the display, and/or the like. The processor 202 and/or user interface circuitry comprising the processor 202 may be configured to control one or more functions of one or more elements of the user interface through computer program instructions, for example, software and/or firmware, stored on the memory 204 accessible to the processor 202, for example, a volatile memory, a non-volatile memory, devices comprising the same, and/or the like. The apparatus 200 may include a battery for powering various circuits related to the mobile terminal, for example, a circuit to provide mechanical vibration as a detectable output. The user input interface may comprise devices allowing the apparatus 200 to receive data, such as a keypad (e.g., a virtual keyboard presented on a display or an externally coupled keyboard) and/or the like.

As shown in FIG. 2, apparatus 200 may also include one or more mechanisms for sharing and/or obtaining data, illustrated as the communication interface 206. For example, the communication interface 206 of the apparatus 200 may include a short-range radio frequency (RF) transceiver and/or interrogator, so data may be shared with and/or obtained from electronic devices in accordance with RF techniques. The apparatus 200 may include other short-range transceivers, such as an infrared (IR) transceiver, a Bluetooth™ (BT) transceiver operating using Bluetooth™ wireless technology, a wireless universal serial bus (USB) transceiver, a Bluetooth™ Low Energy transceiver, a ZigBee transceiver, an ANT transceiver, a cellular device-to-device transceiver, a wireless local area link transceiver, and/or any other short-range radio technology. Apparatus 200 and, in particular, the short-range transceiver may be capable of transmitting data to and/or receiving data from electronic devices within the proximity of the apparatus, such as within about 10 meters, for example. The apparatus 200 including the Wi-Fi or wireless local area networking modem may also be capable of transmitting and/or receiving data from electronic devices according to various wireless networking techniques, including 6LoWpan, Wi-Fi, Wi-Fi low power, WLAN techniques such as IEEE 802.11 techniques, IEEE 802.15 techniques, IEEE 802.16 techniques, and/or the like.

The apparatus 200 may comprise other memory, such as a subscriber identity module (SIM), a removable user identity module (R-UIM), an eUICC, an UICC, and/or the like, which may store information elements related to a mobile subscriber. In addition to the SIM, the apparatus 200 may include other removable and/or fixed memory. The apparatus 200 may include volatile memory and/or non-volatile memory, which can comprise some or all of the memory 204 or can alternatively be a separate memory within or connected to the apparatus 200. For example, volatile memory may include Random Access Memory (RAM) including dynamic and/or static RAM, on-chip or off-chip cache memory, and/or the like. Non-volatile memory, which may be embedded and/or removable, may include, for example, read-only memory, flash memory, magnetic storage devices, for example, hard disks, floppy disk drives, magnetic tape, optical disc drives and/or media, non-volatile random access memory (NVRAM), and/or the like. Like volatile memory, non-volatile memory may include a cache area for temporary storage of data. At least part of the volatile and/or non-volatile memory may be embedded in processor 202. The memories may store one or more software programs, instructions, pieces of information, data, and/or the like which may be used by the apparatus for performing operations disclosed herein. Alternatively or additionally, the apparatus 200 may be configured to cause operations disclosed herein with respect to base stations, WLAN access points, network nodes including the UEs, and the like.

The memories may comprise an identifier, such as an international mobile equipment identification (IMEI) code, capable of uniquely identifying apparatus 200. The memories may comprise an identifier, such as an international mobile equipment identification (IMEI) code, capable of uniquely identifying apparatus 200. In the example embodiment, the processor 202 may be configured using computer code stored at memory and/or to the provide operations disclosed herein with respect to the base stations, WLAN access points, network nodes including the UEs, and the like. Likewise, the apparatus 200 can be configured to be any other component or network equipment from the core network.

Some of the embodiments disclosed herein may be implemented in software, hardware, application logic, or a combination of software, hardware, and application logic. The software, application logic, and/or hardware may reside on memory 204, the control apparatus 202, or electronic components, for example. In some example embodiment, the application logic, software or an instruction set is maintained on any one of various conventional computer-readable media. In the context of this document, a "computer-readable medium" may be any non-transitory media that can contain, store, communicate, propagate or transport the instructions for use by or in connection with an instruction execution system, apparatus, or device, such as a computer or data processor circuitry, with examples depicted at FIG. 2, computer-readable medium may comprise a non-transitory computer-readable storage medium that may be any media that can contain or store the instructions for use by or in connection with an instruction execution system, apparatus, or device, such as a computer.

Without in any way limiting the scope, interpretation, or application of the claims appearing below, a technical effect of one or more of the example embodiments disclosed herein may be improved user equipment or network equipment configuration. As such, any embodiment of a method, system, approach, device, apparatus, or computer program described or illustrated herein is understood to comprise any or all of the components, functionalities, elements, or steps of any other embodiment such that any method can be carried out by the apparatus 200 or by any other suitable system or device, and likewise can be carried out according to a computer program code envisioned within the scope of this disclosure.

In some embodiments, it may be helpful for one or both of a control plane entity or a user plane entity to bundle messages, such as PCFP messages therebetween. Such bundling may be supported by the control plane function and/or the user plane function. Such bundling may be used if such bundling is supported by both the control plane function and the user plane function, for instance, if both the control plane function and the user plane function have indicated support for the bundling of PCFP messages into a single datagram, such as outlined in, e.g., clauses 8.2.25 and 8.2.58 of the 3GPP CT WG4 Change Request filed 16 Aug. 2019, the entire contents of which are hereby incorporated herein by reference for all purposes. For example, in some embodiments, if both the control plane function and the user plane function have indicated support for the bundling of PCFP messages into a single datagram during a PFCP association setup or update procedure, then the use of bundling of such PFCP messages to a single datagram can be carried out.

Such bundling of PFCP messages, for instance, can lead to a reduction in computational complexity and bandwidth requirements, as the current approach of handling each PFCP message separately even if all PFCP messages are intended for a single recipient, such as a single control plane entity or a single user plane entity. According to the approach disclosed herein, there are efficiencies associated with bundling the requests, but there is currently no mechanism according to the current 3GPP or other standards for how to carry out such bundling while also indicating to the intended recipient of such a datagram carrying bundled PFCP messages that multiple PFCP message are included. Under the current approach, even if multiple PFCP messages were bundled and sent to one of a control plane entity or a user plane entity, the recipient would not understand that multiple PFCP messages were being carried by the received datagram.

However, in some embodiments, requirements may apply for how bundling can be carried out. For instance, in some embodiments, several PFCP session related requests and/or responses messages, related to the same PFCP session or to different PFCP sessions handled by the same peer PFCP entity (e.g., with the peer's F-SEID having the same IP address, or with the same peer's IP address for PFCP Session Establishment Requests), may be bundled together in a single UDP/IP packet as specified in clause 7.2.1A of the 16 Aug. 2019 Change Request cited above, when being sent to that peer PFCP entity. In some embodiments, PFCP messages may be bundled towards a PFCP entity of a user plane function or of a control plane function, independently.

Significant performance improvements and enhanced scalability can be achieved by bundling multiple PFCP session related messages (targeting the same peer IP address) in one single UDP/IP packet (e.g., reduced CPU and memory cost thanks to reducing the number of packets to be packetized, exchanged and processed over N4).

In some embodiments, example use cases can include (1) bundling PFCP session related messages for a same UE: for UEs with multiple PDN connections/PDU sessions, transition between (E)CM-IDLE and (E)CM-CONNECTED results in sending many PFCP Session Modification Request messages to request the UPF to forward or buffer DL traffic. (2) bundling PFCP session related messages from different UEs handled by the same peer PFCP entity. In some embodiments, bundling of PFCP session related messages does not have any impact on the existing PFCP procedures, e.g., each PFCP session related message is sent with its normal header and handled as specified currently by the PFCP protocol. Bundling applies for PFCP session related messages sent from the CP function to the UP function, and vice-versa, independently.

In some embodiments, a PFCP messages bundling procedure, which may be optional but which often results in significant performance improvements and enhanced scalability, is defined to enable bundling multiple PFCP session related messages in one single UDP/IP packet.

PFCP Messages Bundling

PFCP messages bundling is an optional procedure that may be supported by the CP function and the UP function. PFCP messages bundling may be used if both the CP function and the UP function have indicated support of the corresponding feature (see clauses 8.2.25 and 8.2.58 of 29.244 CR 0285 for 3GPP TSG-CT WG4 Meeting #93 in Wroclaw, Poland; 26-30 Aug. 2019, the entire disclosure of which is incorporated herein by references for all purposes) during the PFCP Association Setup or Update procedure. If so, the following requirements shall apply.

Several PFCP session related requests and/or responses messages, related to the same PFCP session or to different PFCP sessions handled by the same peer PFCP entity (i.e. with the peer's F-SEID having the same IP address, or with the same peer's IP address for PFCP Session Establishment Requests), may be bundled together in a single UDP/IP packet as specified in clause 7.2.1A, when being sent to that peer PFCP entity. PFCP messages may be bundled towards a PFCP entity of a UP function or of a CP function, independently.

If the CP function bundles few PFCP session related requests in one UDP/IP packet it sends to a UP function, the UP function can return responses in separate UDP/IP packets or it can bundle some of the responses together with other PFCP session related messages.

Bundling PFCP messages in a single UDP/IP packet enable to enhance performance and scalability (reduced CPU and memory cost thanks to reducing the number of packets to be packetized, exchanged and processed over N4).

PFCP session related messages handled by different peer PFCP entities (i.e. with the peer's F-SEID having different IP addresses) shall not be bundled together. PFCP node related messages shall not be bundled either.

The procedures specified in the rest of this specification shall apply for each PFCP message that is bundled in a UDP/IP packet, as if the PFCP message was sent in its own individual UDP/IP packet, i.e. PFCP messages bunding shall not incur any change to the PFCP protocol other than what is described in this clause.

Each PFCP message bundled in a single UDP/IP packet has its own sequence number. Besides, if a UDP/IP packet carrying bundled PFCP messages is lost, retransmitted PFCP messages do not need to be bundled in the same manner as when sent originally.

Message Format

Figure 3:
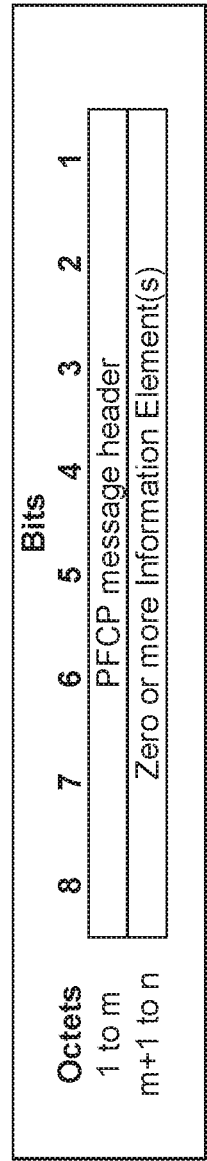
FIG. 3 depicts a typical header for packet forwarding control protocol (PFCP) messages, in accordance with some example embodiments.

A typical format of a PFCP message is depicted in FIG. 3.

In some embodiments, a PFCP message shall contain the PFCP message header and may contain subsequent information element(s) dependent on the type of message.

PFCP messages bundled in one UDP/IP packet

Figure 4:
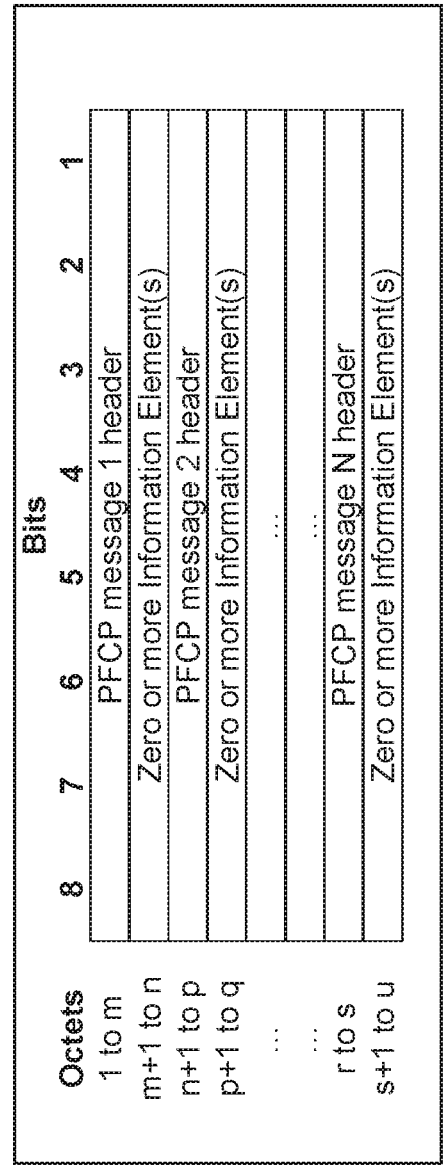
FIG. 4 depicts a UDP/IP packet bundling multiple PFCP messages, in accordance with some example embodiments.
Figure 12:
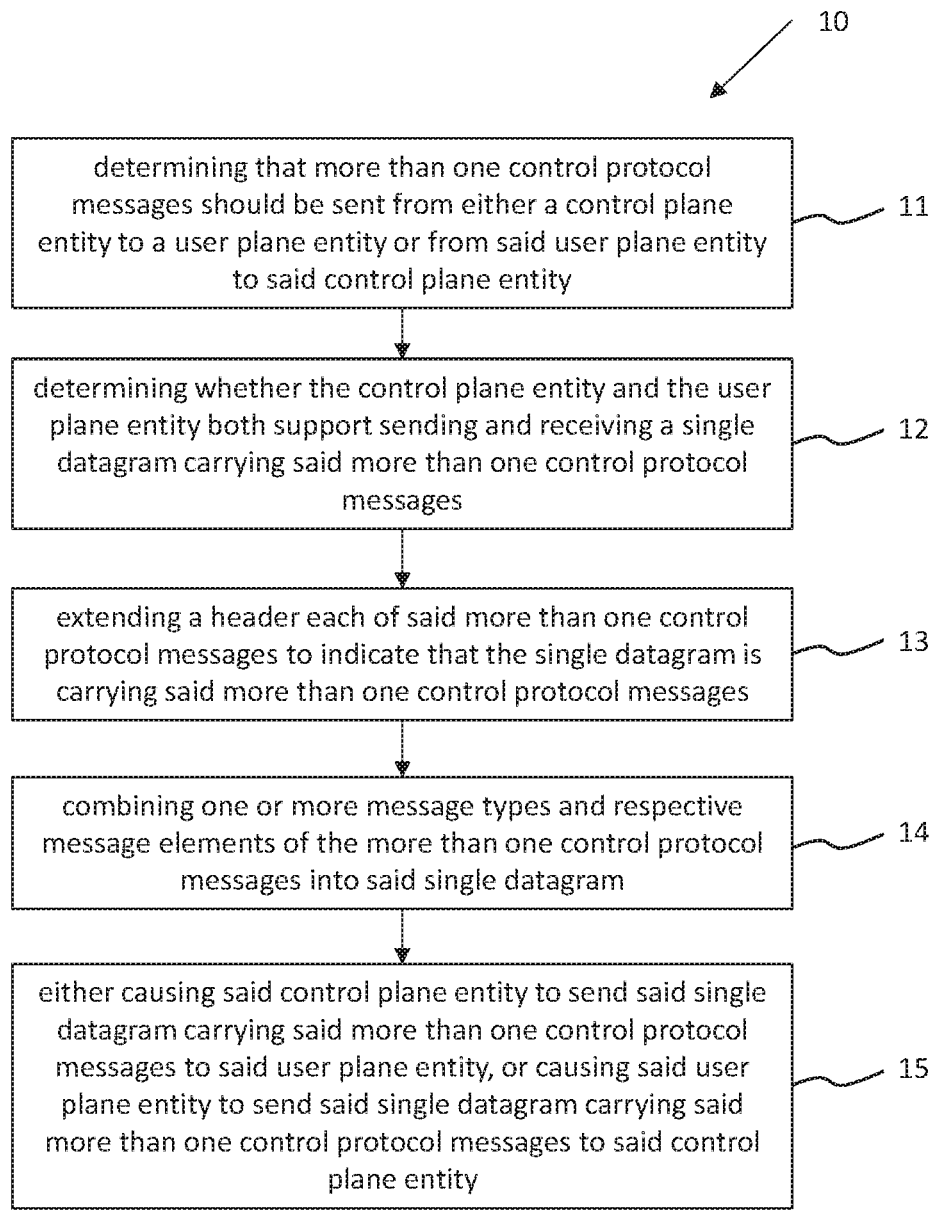
FIG. 12 depicts a process flow diagram of a method for PFCP message bundling, in accordance with some example embodiments.

When applying PFCP messages bunding (see clause 6.x), PFCP messages shall be bundled in one UDP/IP packet as depicted in FIG. 4.

Each bundled PFCP message shall contain its PFCP message header and may contain subsequent information element(s) dependent on the type of message.

The "FO" (Follow On) flag in the PFCP message header of each PFCP message bundled in the UDP/IP packet, except the last PFCP message, shall be set to "1" to indicate that another PFCP message follows in the UDP/IP packet.

Message Header

PFCP messages use a variable length header. The message header length shall be a multiple of 4 octets. Illustrated in FIG. 5 is the format of the PFCP Header, according to one embodiment.

In some embodiments,
i. if S=0, SEID field is not present, k=0, m=0 and n=5;
ii. if S=1, SEID field is present, k=1, m=5 and n=13.

The usage of the PFCP header is defined in clause 7.2.2.4 of 29.244 CR 0285

Octet 1 bits shall be encoded as follows:
i. Bit 1 represents the SEID flag (T).
ii. Bit 2 represents the "MP" flag (see clause 7.2.2.4.1 of 29.244 CR 0285).
iii. Bit 3 represents the "FO" flag (see clause 7.2.2.4.1 of 29.244 CR 0285).
iv. Bit 3 4 to 5 are spare, the sender shall set them to "0" and the receiving entity shall ignore them.
v. Bits 6-8 represent the Version field.

PFCP Header for Node Related Messages

The PFCP message header for the node related messages shall not contain the SEID field, but shall contain the Sequence Number field, followed by one spare octet as depicted in FIG. 6. The spare bits shall be set to zero by the sender and ignored by the receiver. For the Version Not Supported Response message, the Sequence Number may be set to any number and shall be ignored by the receiver.

PFCP Header for Session Related Messages

The PFCP message header, for session related messages, shall contain the SEID and Sequence Number fields followed by one spare octet. The PFCP header is depicted in FIG. 7. The spare bits shall be set to zero by the sender and ignored by the receiver.

Usage of the PFCP Header

The format of the PFCP header is specified in clause 7.2.2 of 29.244 CR 0285.

The usage of the PFCP header shall be as defined below.

The first octet of the header shall be used is the following way:
i. Bit 1 represents the "S" flag, which indicates if SEID field is present in the PFCP header or not. If the "S" flag is set to 0, then the SEID field shall not be present in the PFCP header. If the "S" flag is set to 1, then the SEID field shall immediately follow the Length field, in octets 5 to 12. Apart from the node related messages, in all PFCP messages the value of the "S" flag shall be set to "1".
ii. Bit 2 represents the "MP" flag. If the "MP" flag is set to "1", then bits 8 to 5 of octet 16 shall indicate the message priority.
iii. Bit 3 represents the "FO" (Follow On) flag. If the "FO" flag is set to "1", then another PFCP message follows in the UDP/IP packet (see clauses 6.x and 7.2.1A of 29.244 CR 0285).
iv. Bit 4 is a spare bit. The sending entity shall set it to "0" and the receiving entity shall ignore it.
v. Bit 5 is a spare bit. The sending entity shall set it to "0" and the receiving entity shall ignore it.
vi. Bits 6 to 8, which represent the PFCP version, shall be set to decimal 1 ("001").

The usage of the fields in octets 2–n of the header shall be as specified below.

i. Octet 2 represents the Message type field, which shall be set to the unique value for each type of control plane message. Message type values are specified in Table 7.3-1 "Message types".
ii. Octets 3 to 4 represent the Message Length field. This field shall indicate the length of the message in octets excluding the mandatory part of the PFCP header (the first 4 octets). The SEID (if present) and the Sequence Number shall be included in the length count. The format of the Length field of information elements is specified in clause 8.2 "Information Element Format".
iii. When S=1, Octets 5 to 12 represent the Session Endpoint Identifier (SEID) field. This field shall unambiguously identify a session endpoint in the receiving Packet Forward Control entity. The Session Endpoint Identifier is set by the sending entity in the PFCP header of all control plane messages to the SEID value provided by the corresponding receiving entity (CP or UP function). If a peer's SEID is not available the SEID field shall be present in a PFCP header, but its value shall be set to "0", "Conditions for sending SEID=0 in PFCP header".

The SEID in the PFCP header of a message is set to the SEID value provided by the corresponding receiving entity regardless of whether the source IP address of the request message and the IP Destination Address provided by the receiving entity for subsequent request messages are the same or not.
i. Octets 13 to 15 represent PFCP Sequence Number field.

UP Function Features

The UP Function Features IE indicates the features supported by the UP function. It is coded as depicted in FIGS. 8 and 9.

The UP Function Features IE takes the form of a bitmask where each bit set indicates that the corresponding feature is supported. Spare bits shall be ignored by the receiver. The same bitmask is defined for all PFCP interfaces.

Table 1 specifies the features defined on PFCP interfaces and the interfaces on which they apply.

TABLE 1

| Feature Octet/Bit | Feature | Interface | Description |
|---|---|---|---|
| 5/1 | BUCP | Sxa, N4 | Downlink Data Buffering in CP function is supported by the UP function. |
| 5/2 | DDND | Sxa, N4 | The buffering parameter 'Downlink Data Notification Delay' is supported by the UP function. |
| 5/3 | DLBD | Sxa, N4 | The buffering parameter 'DL Buffering Duration' is supported by the UP function. |
| 5/4 | TRST | Sxb, Sxc, N4 | Traffic Steering is supported by the UP function. |
| 5/5 | FTUP | Sxa, Sxb, N4 | F-TEID allocation/release in the UP function is supported by the UP function. |
| 5/6 | PFDM | Sxb, Sxc, N4 | The PFD Management procedure is supported by the UP function. |
| 5/7 | HEEU | Sxb, Sxc, N4 | Header Enrichment of Uplink traffic is supported by the UP function. |
| 5/8 | TREU | Sxb, Sxc, N4 | Traffic Redirection Enforcement in the UP function is supported by the UP function. |
| 6/1 | EMPU | Sxa, Sxb, N4 | Sending of End Marker packets supported by the UP function. |
| 6/2 | PDIU | Sxa, Sxb, Sxc, N4 | Support of PDI optimised signalling in UP function (see clause 5.2.1A.2). |
| 6/3 | UDBC | Sxb, Sxc, N4 | Support of UL/DL Buffering Control |
| 6/4 | QUOAC | Sxb, Sxc, N4 | The UP function supports being provisioned with the Quota Action to apply when reaching quotas. |
| 6/5 | TRACE | Sxa, Sxb, Sxc, N4 | The UP function supports Trace (see clause 5.x). |
| 6/6 | FRRT | Sxb, N4 | The UP function supports Framed Routing (see IETF RFC 2865 [37] and IETF RFC 3162 [38]). |
| 6/7 | PFDE | Sxb, N4 | The UP function supports a PFD Contents including a property with multiple values. |
| 6/8 | EPFAR | Sxa, Sxb, Sxc, N4 | The UP function supports the Enhanced PFCP Association Release feature (see clause 5.18). |
| 7/1 | DPDRA | Sxb, Sxc, N4 | The UP function supports Deferred PDR Activation or Deactivation. |
| 7/2 | ADPDP | Sxa, Sxb, Sxc, N4 | The UP function supports the Activation and Deactivation of Pre-defined PDRs (see clause 5.19). |
| 7/3 | UEIP | N4 | The UPF supports allocating UE IP addresses or prefixes (see clause 5.21). |
| 7/4 | SSET | N4 | UPF support of PFCP sessions successively controlled by different SMFs of a same SMF Set (see clause 5.22). |
| 7/x | BUNDL | Sxa, Sxb, Sxc, N4 | PFCP messages bunding (see clause 6.x) is supported by the UP function. |

Feature Octet/Bit: The octet and bit number within the Supported-Features IE, e.g. "5/1".
Feature: A short name that can be used to refer to the octet/bit and to the feature.
Interface: A list of applicable interfaces to the feature.
Description: A clear textual description of the feature.

Control Plane Function Features

The CP Function Features IE indicates the features supported by the CP function. Only features having an impact on the (system-wide) UP function behaviour are signalled in this IE. It is coded as depicted in FIGS. 10 and 11.

The CP Function Features IE takes the form of a bitmask where each bit set indicates that the corresponding feature is supported. Spare bits shall be ignored by the receiver. The same bitmask is defined for all PFCP interfaces.

Table 2 specifies the features defined on PFCP interfaces and the interfaces on which they apply.

TABLE 2

| Feature Octet/Bit | Feature | Interface | Description |
| --- | --- | --- | --- |
| 5/1 | LOAD | Sxa, Sxb, Sxc, N4 | Load Control is supported by the CP function. |
| 5/2 | OVRL | Sxa, Sxb, Sxc, N4 | Overload Control is supported by the CP function. |
| 5/3 | EPFAR | Sxa, Sxb, Sxc, N4 | The CP function supports the Enhanced PFCP Association Release feature (see clause 5.18). |
| 5/4 | SSET | N4 | SMF support of PFCP sessions successively controlled by different SMFs of a same SMF Set (see clause 5.22). |
| 5/x | BUNDL | Sxa, Sxb, Sxc, N4 | PFCP messages bunding (see clause 6.x) is supported by the CP function. |

Feature Octet/Bit: The octet and bit number within the Supported-Features IE, e.g. "5/1".
Feature: A short name that can be used to refer to the octet/bit and to the feature.
Interface: A list of applicable interfaces to the feature.
Description: A clear textual description of the feature.

In some embodiments, if the control plane function bundles multiple PFCP session related requests in one UDP/IP packet, as illustrated in FIG. 4, it may send the UDP/IP packet bundle to a user plane function, the user plane function can return responses in one or more separate UDP/IP packets or it can bundle some of the responses together with other PFCP session related response or other messages. In some embodiments, bundling PFCP messages in a single UDP/IP packet enables enhanced performance and scalability (e.g., reduced CPU and memory cost thanks to reducing the number of packets to be packetized, exchanged and processed over N4). Illustrated in FIG. 5 is a header for PFCP messages in which bit 3 of octet 1, which is typically "spare" is now occupied by a follow on (FO) flag to indicate to recipients of the datagram that the datagram includes more than one control message (e.g., PFCP messages) bundled together.

In addition, as illustrated in FIG. 8, a user plane function may be configured to support certain features or mechanism, such as bundled messages in the datagram, which can be indicated in the header of a message between the user plane function and the control plane function. A similar message can be communicated between the control plane function and the user plane function to indicate the capabilities and configurations of the control plane function for purposes of bundling control messages in a single datagram. For instance, as illustrated in FIG. 9, a particular message during an association setup or update procedure can include a "BUNDL" flag that indicates, for example for Sxa, Sxb, Sxc, or N4 interfaces, that PFCP message bundling is supported. A similar message for the control plane function can be generated and sent, as illustrated in FIGS. 10 and 11, to indicate to a recipient of the message, e.g., a user plane function, that the control plane function is capable of receiving datagrams carrying bundled PFCP messages or the like. For instance, in the 5G network illustrated in FIG. 1, the apparatus of FIG. 2 can be used to exchange the capability between the SMF and UPF to know that both nodes support this capability so that any of the various entities can use this mechanism.

In some embodiments, PFCP session related messages handled by different peer PFCP entities (e.g., with the peer's F-SEID having different IP addresses) may or shall not be bundled together. In some embodiments, PFCP node related messages shall not be bundled either.

In some embodiments, the procedures specified in the rest of the 3GPP Release 16 specification shall apply for each PFCP message that is bundled in a UDP/IP packet, as if the PFCP message was sent in its own individual UDP/IP packet, e.g., PFCP messages bunding shall not incur any change to the PFCP protocol other than what is described in this disclosure.

In some embodiments, each PFCP message bundled in a single UDP/IP packet may have its own sequence number within the bundle. In some embodiments, if a UDP/IP packet carrying bundled PFCP messages is lost, retransmitted PFCP messages do not need to be bundled in the same manner as when sent originally.

Referring now to FIG. 11, a method 10 can be carried out by an apparatus, such as the apparatus 200 illustrated in FIG. 2 or the like. For instance, there may be provided an apparatus including at least one processor and at least one memory including computer program code, the at least one memory and the computer program code configured to carry out the method 10. In some embodiments, the method can comprise determining that more than one control protocol messages should be sent from either a control plane entity to a user plane entity or from said user plane entity to said control plane entity, at 11. In some embodiments, the method 10 can further comprise determining whether the control plane entity and the user plane entity both support sending and receiving a single datagram carrying said more than one control protocol messages, at 12. In some embodiments, the method 10 can further comprise extending a header each of said more than one control protocol messages to indicate that the single datagram is carrying said more than one control protocol messages, at 13. In some embodiments, the method 10 can further comprise combining one or more message types and respective message elements of the more than one control protocol messages into said single datagram, at 14. In some embodiments, the method 10 can further comprise either causing said control plane entity to send said single datagram carrying said more than one control protocol messages to said user plane entity, or causing said user plane entity to send said single datagram carrying said more than one control protocol messages to said control plane entity, at 15.

In some embodiments, said user plane entity comprises a user plane function and said control plane entity comprises a session management function. In some embodiments, said session management function can comprise a 5GC session management function and/or an evolved packet core (EPC) (SWG-C), (PGW-C), (TDF-C), and/or the like. In some embodiments, said control protocol message comprises a packet forwarding control protocol (PFCP) message. In some embodiments, the method can further comprise extending the header of each of said more than one control protocol messages to include a follow on flag to indicate that the single datagram is carrying said more than one control protocol messages. In some embodiments, said single control protocol message comprises a single user datagram/internet protocol (UDP/IP) packet configured to be packetized, exchanged, and processed over an N4 interface in a fifth generation core (5GC) network or over an Sxa Sxb or Sxc interface in an Evolved Packet Core (EPC) network. In some embodiments, said more than one control protocol messages carried in a single control protocol message are control plane requests or responses related to a same PFCP session or to different PFCP sessions handled by a same peer PFCP entity.

The above-noted aspects and features may be implemented in systems, apparatus, methods, and/or articles depending on the desired configuration. The details of one or more variations of the subject matter described herein are set forth in the accompanying drawings and the Detailed Description. Features and advantages of the subject matter described herein will be apparent from the description and drawings, and from the claims.

The subject matter described herein may be embodied in systems, apparatus, methods, and/or articles depending on the desired configuration. For example, the control plane and user plane entities (or one or more components therein or associated with the same) and/or the processes described herein can be implemented using one or more of the following: a processor executing program code, an application-specific integrated circuit (ASIC), a digital signal processor (DSP), an embedded processor, a field programmable gate array (FPGA), and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. These computer programs (also known as programs, software, software applications, applications, components, program code, or code) may include machine instructions for a programmable processor and may be implemented in a high-level procedural and/or object-oriented programming language, and/or in assembly/machine language. As used herein, the term "computer-readable medium" refers to any computer program product, machine-readable medium, computer-readable storage medium, apparatus and/or device (for example, magnetic discs, optical disks, memory, Programmable Logic Devices (PLDs)) used to provide machine instructions and/or data to a programmable processor, including a machine-readable medium that receives machine instructions. Similarly, systems are also described herein that may include a processor and a memory coupled to the processor. The memory may include one or more programs that cause the processor to perform one or more of the operations described herein.

Although a few variations have been described in detail above, other modifications or additions are possible. In particular, further features and/or variations may be provided in addition to those set forth herein. Moreover, the implementations described above may be directed to various combinations and subcombinations of the disclosed features and/or combinations and subcombinations of several further features disclosed above. Other embodiments may be within the scope of the following claims.

If desired, the different functions discussed herein may be performed in a different order and/or concurrently with each other. Furthermore, if desired, one or more of the above-described functions may be optional or may be combined. Although various aspects of some of the embodiments are set out in the independent claims, other aspects of some of the embodiments comprise other combinations of features from the described embodiments and/or the dependent claims with the features of the independent claims, and not solely the combinations explicitly set out in the claims. It is also noted herein that while the above describes example embodiments, these descriptions should not be viewed in a limiting sense. Rather, there are several variations and modifications that may be made without departing from the scope of some of the embodiments as defined in the appended claims. Other embodiments may be within the scope of the following claims. The term "based on" includes "based on at least." The use of the phase "such as" means "such as for example" unless otherwise indicated.

It shall be appreciated that the terms user entity and user equipment are intended to cover any suitable type of wireless user equipment, such as mobile telephones, portable data processing devices or portable web browsers. It shall also be appreciated that the terms user entity and user equipment are intended to cover any suitable type of non-portable user equipment, such as a television receiver, desk top data processing devices or set-top boxes.

In general, the various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD. The memory may be of any type suitable to the local technical environment and may be implemented using any suitable data storage technology, such as semiconductor based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs) and processors based on multi core processor architecture, as non limiting examples.

For instance, examples of embodiments provided herein include methods, apparatuses, and computer program products are provided for packet forwarding control protocol (PFCP) message bundling.

In some example embodiments, there may be provided an apparatus including at least one processor and at least one memory including computer program code, the at least one memory and the computer program code configured to, with the at least one processor, cause the apparatus to at least: determine that more than one control protocol messages should be sent from either a control plane entity to a user plane entity or from said user plane entity to said control plane entity; determine whether the control plane entity and the user plane entity both support sending and receiving a single datagram carrying said more than one control protocol messages; extend a header of each of said more than one control protocol messages to indicate that the single datagram is carrying said more than one control protocol messages; combine one or more message types and respective message elements of the more than one control protocol messages into said single datagram; and either cause said control plane entity to send said single datagram carrying said more than one control protocol messages to said user plane entity, or cause said user plane entity to send said single datagram carrying said more than one control protocol messages to said control plane entity. In some embodiments, said user plane entity comprises a user plane function and said control plane entity comprises a session management function. In some embodiments, said session management function can comprise a 5GC session management function and/or an evolved packet core (EPC) (SWG-C), (PGW-C), (TDF-C), and/or the like. In some embodiments, said control protocol message comprises a packet forwarding control protocol (PFCP) message. In some embodiments, the at least one memory and the computer program code configured to, with the at least one processor, cause the apparatus to at least: extend the header of each of said more than one control protocol messages to include a follow on flag to indicate that the single datagram is carrying said more than one control protocol messages. In some embodiments, said single control protocol message comprises a single UDP/IP packet configured to be packetized, exchanged, and processed over an N4 interface in a fifth generation core (5GC) network or over an Sxa, Sxb, or Sxc interface in an Evolved Packet Core (EPC) network. In some embodiments, said more than one control protocol messages carried in a single control protocol message are control plane requests or responses related to a same PFCP session or to different PFCP sessions handled by a same peer PFCP entity.

According to another embodiment, a method is provided, said method comprising determining that more than one control protocol messages should be sent from either a control plane entity to a user plane entity or from said user plane entity to said control plane entity; determining whether the control plane entity and the user plane entity both support sending and receiving a single datagram carrying said more than one control protocol messages; extending a header of each of said more than one control protocol messages to indicate that the single datagram is carrying said more than one control protocol messages; combining one or more message types and respective message elements of the more than one control protocol messages into said single datagram; and either causing said control plane entity to send said single datagram carrying said more than one control protocol messages to said user plane entity, or causing said user plane entity to send said single datagram carrying said more than one control protocol messages to said control plane entity. In some embodiments, said user plane entity comprises a user plane function and said control plane entity comprises a session management function. In some embodiments, said session management function can comprise a 5GC session management function and/or an evolved packet core (EPC) (SWG-C), (PGW-C), (TDF-C), and/or the like. In some embodiments, said control protocol message comprises a packet forwarding control protocol (PFCP) message. In some embodiments, the method can further comprise extending the header of each of said more than one control protocol messages to include a follow on flag to indicate that the single datagram is carrying said more than one control protocol messages. In some embodiments, said single control protocol message comprises a single user datagram/internet protocol (UDP/IP) packet configured to be packetized, exchanged, and processed over an N4 interface in a fifth generation core (5GC) network or over an Sxa Sxb or Sxc interface in an Evolved Packet Core (EPC) network. In some embodiments, said more than one control protocol messages carried in a single control protocol message are control plane requests or responses related to a same PFCP session or to different PFCP sessions handled by a same peer PFCP entity.

According to yet another embodiment, an apparatus is provided, said apparatus comprising means, such as the apparatus described above comprising one or more processors and one or more memory including program code, for determining that more than one control protocol messages should be sent from either a control plane entity to a user plane entity or from said user plane entity to said control plane entity; means for determining whether the control plane entity and the user plane entity both support sending and receiving a single datagram carrying said more than one control protocol messages; means for extending a header of each of said more than one control protocol messages to indicate that the single datagram is carrying said more than one control protocol messages; means for combining one or more message types and respective message elements of the more than one control protocol messages into said single datagram; and either means for causing said control plane entity to send said single datagram carrying said more than one control protocol messages to said user plane entity, or means for causing said user plane entity to send said single datagram carrying said more than one control protocol messages to said control plane entity. In some embodiments, said user plane entity comprises a user plane function and said control plane entity comprises a session management function. In some embodiments, said session management function can comprise a 5GC session management function and/or an evolved packet core (EPC) (SWG-C), (PGW-C), (TDF-C), and/or the like. In some embodiments, said control protocol message comprises a packet forwarding control protocol (PFCP) message. In some embodiments, said apparatus can further comprise means for extending the header of each of said more than one control protocol messages to include a follow on flag to indicate that the single datagram is carrying said more than one control protocol messages. In some embodiments, said single control protocol message comprises a single UDP/IP packet configured to be packetized, exchanged, and processed over an N4 interface in a fifth generation core (5GC) network or over an Sxa Sxb or Sxc interface in an Evolved Packet Core (EPC) network. In some embodiments, said more than one control protocol messages carried in a single control protocol message are control plane requests or responses related to a same PFCP session or to different PFCP sessions handled by a same peer PFCP entity.

According to still another embodiment, a computer readable medium is provided, such as a non-transitory computer readable including program code which, when executed, causes operations comprising: determining that more than one control protocol messages should be sent from either a control plane entity to a user plane entity or from said user plane entity to said control plane entity; determining whether the control plane entity and the user plane entity both support sending and receiving a single datagram carrying said more than one control protocol messages; extending a header of each of said more than one control protocol messages to indicate that the single datagram is carrying said more than one control protocol messages; combining one or more message types and respective message elements of the more than one control protocol messages into said single datagram; and either causing said control plane entity to send said single datagram carrying said more than one control protocol messages to said user plane entity, or causing said user plane entity to send said single datagram carrying said more than one control protocol messages to said control plane entity. In some embodiments, said user plane entity comprises a user plane function and said control plane entity comprises a session management function. In some embodiments, said session management function can comprise a 5GC session management function and/or an evolved packet core (EPC) (SWG-C), (PGW-C), (TDF-C), and/or the like. In some embodiments, said control protocol message comprises a packet forwarding control protocol (PFCP) message. In some embodiments, the program code, when executed, can further cause operations comprising: extending the header of each of said more than one control protocol messages to include a follow on flag to indicate that the single datagram is carrying said more than one control protocol messages. In some embodiments, said single control protocol message comprises a single UDP/IP packet configured to be packetized, exchanged, and processed over an N4 interface in a fifth generation core (5GC) network or over an Sxa Sxb or Sxc interface in an Evolved Packet Core (EPC) network. In some embodiments, said more than one control protocol messages carried in a single control protocol message are control plane requests or responses related to a same PFCP session or to different PFCP sessions handled by a same peer PFCP entity.

The above-noted aspects and features may be implemented in systems, apparatus, methods, and/or articles depending on the desired configuration. The details of one or more variations of the subject matter described herein are set forth in the accompanying drawings and the description below. Features and advantages of the subject matter described herein will be apparent from the description and drawings, and from the claims. The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

What is claimed is:

1. An apparatus comprising:
    at least one processor; and
    at least one memory including computer program code, the at least one memory and the computer program code configured to, with the at least one processor, cause the apparatus to at least:
        determine that more than one control protocol messages should be sent from either a control plane entity to a user plane entity or from said user plane entity to said control plane entity;
        determine whether the control plane entity and the user plane entity both support sending and receiving a single datagram carrying said more than one control protocol messages;
        extend a header of each of said more than one control protocol messages to indicate that another control protocol message follows in said single datagram;
        combine one or more message types and respective message elements of the more than one control protocol messages into said single datagram; and
        either cause said control plane entity to send said single datagram carrying said more than one control protocol messages to said user plane entity, or cause said user plane entity to send said single datagram carrying said more than one control protocol messages to said control plane entity.

2. The apparatus of claim 1, wherein said user plane entity comprises a user plane function and said control plane entity comprises a session management function.

3. The apparatus of claim 1, wherein each of said more than one control protocol messages comprises a packet forwarding control protocol (PFCP) message.

4. The apparatus of claim 1, wherein the at least one memory and the computer program code are configured to, with the at least one processor, cause the apparatus to at least:
    extend the header of each of said more than one control protocol messages to include a follow on flag to indicate that another control protocol message follows in said single datagram.

5. The apparatus of claim 1, wherein said single datagram comprises a single user datagram/internet protocol (UDP/IP) packet configured to be packetized, exchanged, and processed over an N4 interface in a fifth generation core (5GC) network or over an Sxa interface, an Sxb interface, or an Sxc interface in an Evolved Packet Core (EPC) network.

6. The apparatus of claim 3, wherein said more than one control protocol messages carried in said single datagram are control plane requests or responses related to a same PFCP session or to different PFCP sessions handled by a same peer PFCP entity.

7. A method comprising:
    determining that more than one control protocol messages should be sent from either a control plane entity to a user plane entity or from said user plane entity to said control plane entity;
    determining whether the control plane entity and the user plane entity both support sending and receiving a single datagram carrying said more than one control protocol messages;

extending a header of each of said more than one control protocol messages to indicate that another control protocol message follows in said single datagram;

combining one or more message types and respective message elements of the more than one control protocol messages into said single datagram; and either causing said control plane entity to send said single datagram carrying said more than one control protocol messages to said user plane entity, or causing said user plane entity to send said single datagram carrying said more than one control protocol messages to said control plane entity.

8. The method of claim 7, wherein said user plane entity comprises a user plane function and said control plane entity comprises a session management function.

9. The method of claim 7, wherein each of said more than one control protocol messages comprises a packet forwarding control protocol (PFCP) message.

10. The method of claim 7, further comprising:
extending the header of each of said more than one control protocol messages to include a follow on flag to indicate that another control protocol message follows in said single datagram.

11. The method of claim 7, wherein said single datagram comprises a single user datagram/internet protocol (UDP/IP) packet configured to be packetized, exchanged, and processed over an N4 interface in a fifth generation core (5GC) network or over an Sxa interface, an Sxb interface, or an Sxc interface in an Evolved Packet Core (EPC) network.

12. The method of claim 9, wherein said more than one control protocol messages carried in said single datagram are control plane requests or responses related to a same PFCP session or to different PFCP sessions handled by a same peer PFCP entity.

13. A non-transitory computer readable medium including program code which, when executed, causes operations comprising:
determining that more than one control protocol messages should be sent from either a control plane entity to a user plane entity or from said user plane entity to said control plane entity;
determining whether the control plane entity and the user plane entity both support sending and receiving a single datagram carrying said more than one control protocol messages;
extending a header of each of said more than one control protocol messages to indicate that another control protocol message follows in said single datagram;
combining one or more message types and respective message elements of the more than one control protocol messages into said single datagram; and
either causing said control plane entity to send said single datagram carrying said more than one control protocol messages to said user plane entity, or causing said user plane entity to send said single datagram carrying said more than one control protocol messages to said control plane entity.

14. The computer readable medium of claim 13, wherein said user plane entity comprises a user plane function and said control plane entity comprises a session management function.

15. The computer readable medium of claim 13, wherein each of said more than one control protocol messages comprises a packet forwarding control protocol (PFCP) message.

16. The computer readable medium of claim 13, wherein the program code, when executed, further causes operations comprising:
extending the header of each of said more than one control protocol messages to include a follow on flag to indicate that another control protocol message follows in said single datagram.

17. The computer readable medium of claim 13, wherein said single datagram comprises a single user datagram/internet protocol (UDP/IP) packet configured to be packetized, exchanged, and processed over an N4 interface in a fifth generation core (5GC) network or over an Sxa interface, an Sxb interface, or an Sxc interface in an Evolved Packet Core (EPC) network.

18. The computer readable medium of claim 14, wherein said more than one control protocol messages carried in a single datagram are control plane requests or responses related to a same PFCP session or to different PFCP sessions handled by a same peer PFCP entity.

* * * * *